June 14, 1932.                I. VIITA                1,862,777
CLAM DIGGER
Filed Aug. 20, 1928          3 Sheets-Sheet 1
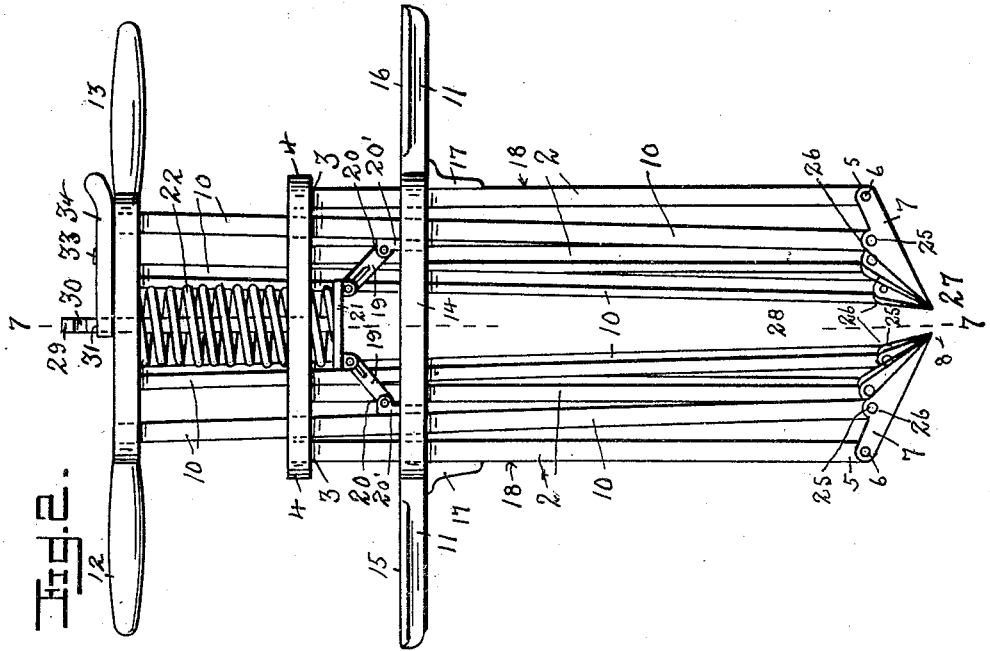
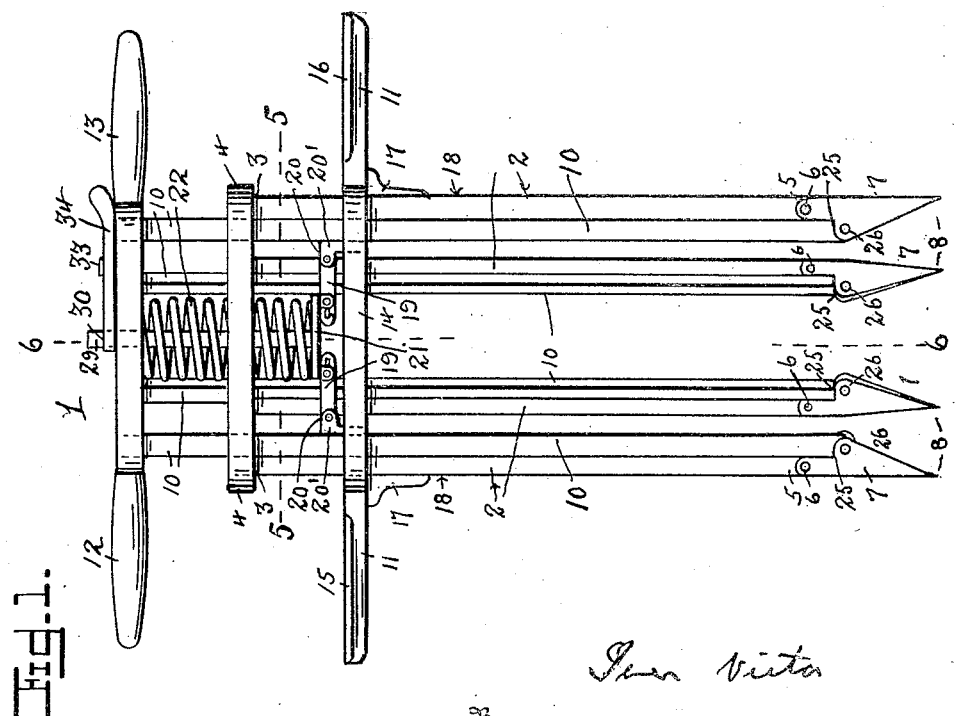

June 14, 1932.  I. VIITA  1,862,777
CLAM DIGGER
Filed Aug. 20, 1928  3 Sheets-Sheet 2
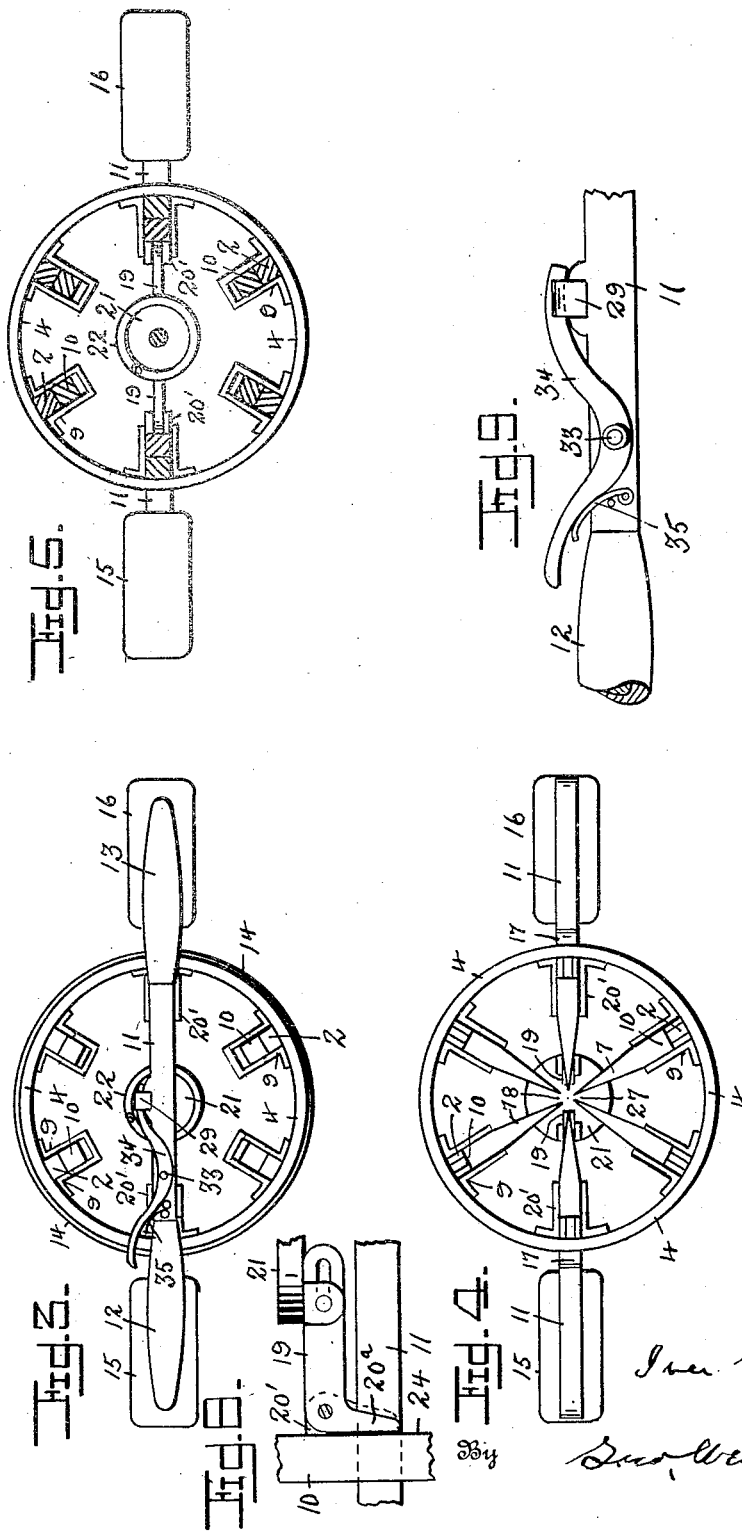

June 14, 1932.    I. VIITA    1,862,777
CLAM DIGGER
Filed Aug. 20, 1928    3 Sheets-Sheet 3
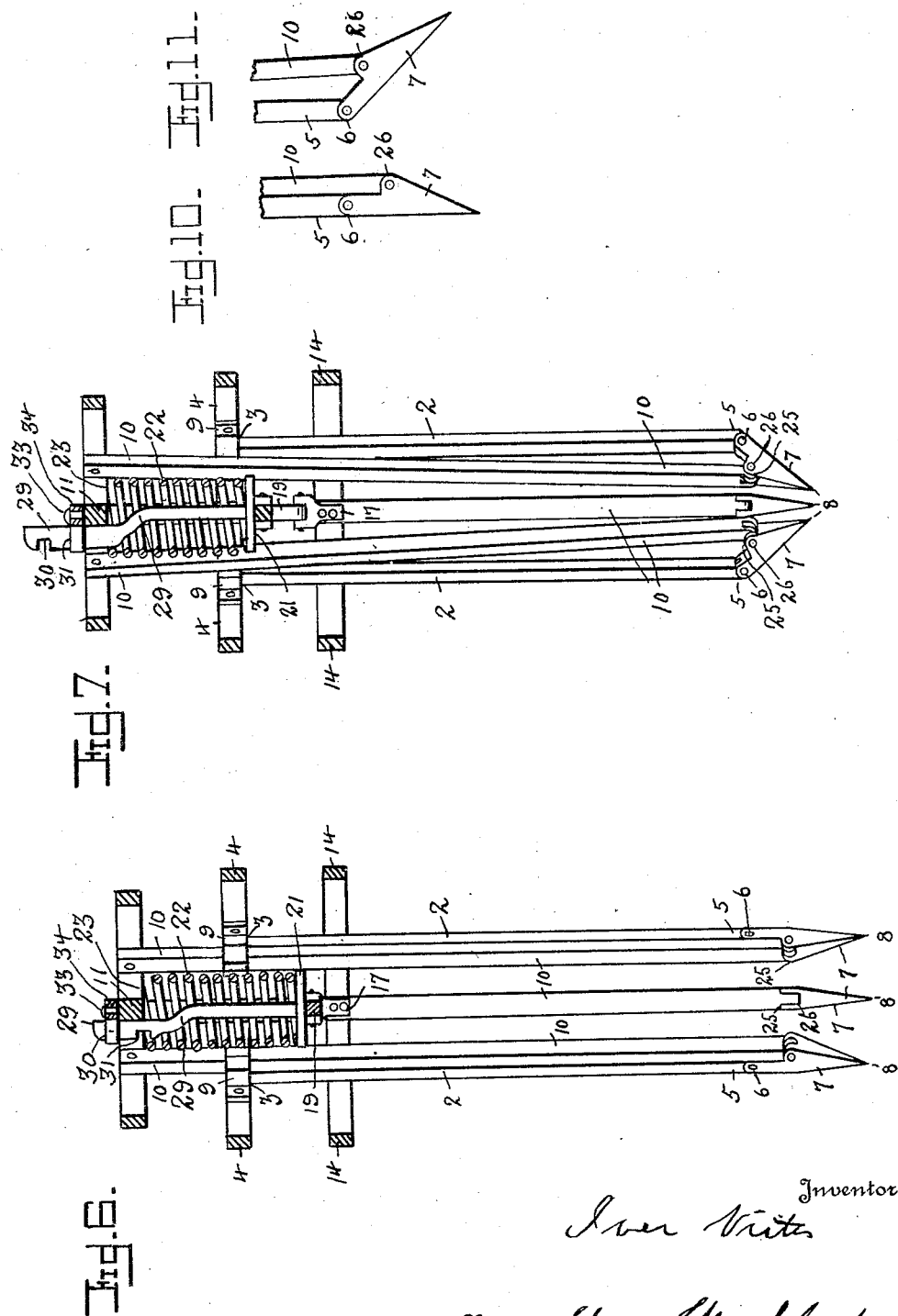

Patented June 14, 1932

1,862,777

UNITED STATES PATENT OFFICE

IVER VIITA, OF CLE ELUM, WASHINGTON

CLAM DIGGER

Application filed August 20, 1928. Serial No. 300,728.

This invention relates to improvements in a device for digging clams, and has for its object to provide means whereby a clam may be quickly extracted from the sand.

Another object of the invention is to provide a cage having an open bottom adapted to be projected down into the sand around an embedded clam, and means whereby the clam may be entrapped in the cage and withdrawn from the sand.

With the above and such other objects in view as may hereinafter more fully appear, I have invented the device shown in the accompanying drawings in which:

Figure 1 is an elevational view of my device shown set for operation;

Figure 2 is a similar view showing the trap sprung;

Figure 3 is a top plan view;

Figure 4 is a bottom plan view of Figure 2;

Figure 5 is a section on line 5—5 of Figure 1;

Figure 6 is a section on line 6—6 of Figure 1; and

Figure 7 is a section on line 7—7 of Figure 2.

Figure 8 is a detail of the locking mechanism;

Figure 9 is a detail of one of the stop devices;

Figure 10 is a diagrammatic view of one of the fingers in sand-penetrating position; and Figure 11 is a similar view with the finger arranged in clam-engaging position.

Like reference characters indicate like parts throughout the following specification and in the several views in the drawings in which 1 indicates a clam digging device, which consists of a cage formed of a series of vertically fixed, spaced apart legs 2, fixedly connected at their upper ends 3, to the ring 4, which rods taper toward their lower ends 5 and have pivotally connected thereto at 6, fingers 7, which terminate in points 8 the length of which fingers are substantially one-half the diameter of the said cage. A series of straps 9 arranged at points adjacent the upper ends 3 of the legs 2, internally of the ring 4, and form recesses through which the vertically and laterally movable rods 10 operate. The upper ends of certain of the rods 10 are pivoted to the cross head 11, having handles 12 and 13 projecting from the opposing ends of said cross head. Another ring 14 encircles the legs 2, and is slidable there-over said ring being fixed to the rods 10 and movable therewith. Foot pieces 15 and 16 extend from the opposing sides of the ring 14, and are provided with fixed depending bracket members 17, slidable upon the outer surface 18 of the legs 2. Pivotally connected internally of the ring 14, are a series of inwardly projecting arms 19, pivoted at their heels 20 to the brackets 20' on said ring, said arms having depending toe portions 20a with flat surfaces 20b adapted to seat against the inner surfaces 24 of the members 10, when in horizontal position. The outer ends of those arms 19 are pivotally connected to a disk 21, upon which is seated one end of a coil spring 22, passing through the ring 4, and the other end 23 of which spring seats against the cross head 11. The lower ends 25 of the rods 10 are pivotally connected to a central offset 26 of the fingers 7, in order that when the handles 12 and 13 are drawn upwardly with the feet of the operator upon the foot-pieces 15 and 16, the fingers 7, through their legs 2, have been projected into the sand around the embedded clam, they draw the fingers 7 centerward closing the bottom 27 of the cage 28, whereupon the clam may be withdrawn from the sand.

Connected to the disk 21, and extending upwardly through the spring 22, and past the bar 11, is a rod 29 having spaced notches 30 and 31.

Pivoted at 33 on the bar 11 is a lock lever 34, spring urged as shown at 35, and adapted to engage alternately with the notches 30 and 31, when operated by the thumb of the operator when grasping the hand grip 13. By this arrangement when the device is forced into the sand to enclose the clam, the bar 29, being held rigidly by the engagement of the lock lever 34, with the upper notch 30, maintains the links 19 in their lower or distended position and correspondingly holds the finger members 7 in longitudinal alinement with the legs 2, as shown in Figure 1, to enable the implement to be readily forced into the sand when the implement reaches its downward position, or with the fingers 7 below the clam, the operator first compresses the lock lever 34 to release the bar 29, and then draws the bars 10 upwardly against the resistance of the spring 22, and causes the links 19 to draw the bars 10 inwardly and likewise draw the fingers 7 upwardly into the position shown in Figure 2. This upward movement of the bars 10 disposes the lower notch 31 in position to be engaged by the lock lever 34 and thus hold the links 19 in their upper position and the fingers 7 in their inner position to enable the entrapped clam to be removed from the sand.

Having described my invention that which I claim to be new, and desire to procure by Letters Patent is:

1. A clam digger including a cage formed of a series of vertical legs, having pointed pivotal ends, and means for moving said ends to close the bottom of said cage, said means consisting of vertically movable rods.

2. A clam digger including a cage formed of a series of vertical legs, having pointed pivotal ends, means for moving said ends to close the bottom of said cage, said means consisting of vertically movable rods, and a cross head connected to certain of said rods.

3. A clam digger including a cage formed of a series of vertical legs, having pointed pivotal ends, means for moving said ends to close the bottom of said cage, said means consisting of rods certain of which are vertically movable, and a cross head connected to certain of said rods, through means of which all of said rods may be operated.

4. A clam digger including a cage formed of a series of vertical legs, having pointed pivotal ends, means for moving said ends from vertical to horizontal position to close the bottom of said cage, said means consisting of rods certain of which are vertically movable, a cross head connected to certain of said rods, through means of which all of said rods may be operated, and a ring to which said legs are fixed.

5. As claimed in claim 4 and a ring to which said rods are attached.

6. As claimed in claim 4 and a ring to which said rods are attached, pivotally.

7. As claimed in claim 4 a ring to which said rods are attached, pivotally, and means for normally holding said cross head and said last ring apart.

8. As claimed in claim 4 a ring to which said rods are attached, pivotally, and means for normally holding said cross head and said last ring apart, said means including a coil spring.

9. A clam digger including a cage formed of a series of legs, having pointed pivotal ends, means for moving said ends inward to close the bottom of said cage, said means consisting of vertically movable rods, a cross head connected to said legs, through means of which they are vertically operated, a ring to which said rods are attached, means for normally holding said cross head and said ring apart, said means including a coil spring, and means carried by one end of said ring for moving said legs.

10. As claimed in claim 9 and a ring forming said connection.

11. As claimed in claim 9 and a ring forming said connection a ring having foot pieces fixed to said legs.

12. As claimed in claim 9 and a ring forming said connection a ring having foot pieces fixed to said legs, and means for holding said last ring and said cross head toward one another against the tension of said spring.

13. As claimed in claim 9 and a ring forming said connection a ring having foot pieces fixed to said legs, and means for holding said last ring and said cross head toward one another against the tension of said spring, said means consisting of a pivoted lever.

14. A clam digger embracing a basket formed of a series of legs and a series of rods vertically movable relative thereto.

15. A clam digger embracing a basket formed of a series of legs and a series of rods vertically movable relative thereto, said legs having pointed terminals.

16. A clam digger embracing a basket formed of a series of legs and a series of rods vertically movable relative thereto, said legs having pointed terminals, said terminals being hingedly connected to the legs.

17. A clam digger embracing a basket formed of a series of legs and a series of rods vertically movable relative thereto, said legs having pointed terminals, said terminals being hingedly connected to the legs, and adapted to close inwardly to form a bottom for the basket.

18. A clam digger comprising a cage formed of a series of legs and fingers pivotally connected to the extreme terminals of each of said legs.

19. A clam digger comprising a cage formed of a series of legs and fingers pivotally connected to the extreme terminals of each of said legs, said fingers being shaped to pierce the sand on their downward movement.

20. A clam digger comprising a cage formed of a series of legs and fingers pivotally connected to the extreme terminals of each of said legs, said fingers being shaped to pierce the sand on their downward movement, and manual means for moving said fingers centerward of said cage to form a bottom therefor.

21. A clam digger comprising a cage formed of a series of legs and fingers pivotally connected to the extreme terminals of each of said legs, said fingers being shaped to pierce the sand on their downward movement, and manual means for moving said fingers centerward of said cage to form a bottom therefor, said means comprising rods movable vertically relative to said legs.

22. The device as claimed in claim 21, and movable laterally relative to said legs.

23. The device as claimed in claim 21, and movable laterally relative to said legs, said movements being simultaneous.

24. The device as claimed in claim 21, and movable laterally relative to said legs, said movements being simultaneous, said rods being pivoted to said fingers.

25. The device as claimed in claim 21, and movable laterally relative to said legs, said movements being simultaneous, said rods being pivoted to said fingers, and intermediate their ends.

26. The device as claimed in claim 21, and movable laterally relative to said legs, said movements being simultaneous, said rods being pivoted to said fingers, and intermediate their ends, treadle members connected to said legs whereby they may be held embedded in the sand.

27. The device as claimed in claim 21, and movable laterally relative to said legs, said movements being simultaneous, said rods being pivoted to said fingers, and intermediate their ends, treadle members connected to said legs whereby they may be held embedded in the sand, and a pull member to which said rods are connected.

In testimony whereof I affix my signature.

IVER VIITA.